US009395866B2

(12) United States Patent
Lettau

(10) Patent No.: US 9,395,866 B2
(45) Date of Patent: Jul. 19, 2016

(54) METHOD AND APPARATUS FOR SUMMONING A PALETTE

(75) Inventor: Ty Lettau, Hercules, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1240 days.

(21) Appl. No.: 11/780,807

(22) Filed: Jul. 20, 2007

(65) Prior Publication Data

US 2009/0024938 A1 Jan. 22, 2009

(51) Int. Cl.
*G06F 3/0481* (2013.01)

(52) U.S. Cl.
CPC .................. *G06F 3/0481* (2013.01)

(58) Field of Classification Search
CPC .......................... G06F 3/04842; G06F 3/04892
USPC ................................................... 715/858, 856
See application file for complete search history.

(56) References Cited

U.S. PATENT DOCUMENTS

| 5,666,499 | A | * | 9/1997 | Baudel et al. ................. 715/808 |
| 5,694,562 | A | * | 12/1997 | Fisher ........................... 715/839 |
| 5,805,167 | A | | 9/1998 | Van Cruyningen |
| 5,870,091 | A | * | 2/1999 | Lazarony et al. ............. 715/804 |
| 5,883,626 | A | * | 3/1999 | Glaser et al. .................. 715/788 |
| 6,057,844 | A | | 5/2000 | Strauss |
| 6,414,700 | B1 | | 7/2002 | Kurtenbach et al. |
| 6,826,729 | B1 | * | 11/2004 | Giesen et al. ................. 715/837 |
| 7,418,671 | B2 | * | 8/2008 | Hama et al. ................... 715/830 |
| 2006/0036946 | A1 | * | 2/2006 | Radtke et al. ................. 715/711 |
| 2007/0240057 | A1 | * | 10/2007 | Satterfield et al. ............ 715/705 |
| 2007/0247394 | A1 | * | 10/2007 | Boyan ............................. 345/23 |
| 2008/0072177 | A1 | * | 3/2008 | Santos et al. ................. 715/821 |

OTHER PUBLICATIONS

International Search Report mailed Oct. 16, 2008 in counterpart International Application Serial No. PCT/US2008/070308.

* cited by examiner

*Primary Examiner* — Jeffrey A Gaffin
*Assistant Examiner* — Sabrina Greene
(74) *Attorney, Agent, or Firm* — Kilpatrick Townsend & Stockton LLP

(57) ABSTRACT

A method, apparatus and computer program product for summoning a palette to a cursor location is presented. An application is run, the application having a work area in a Graphical User Interface (GUI). The application includes at least one palette associated therewith. A cursor can be operated within the work area. An input is provided causing one of the at least one palette to be presented at a location adjacent the cursor, and wherein the palette is maintained at the location.

17 Claims, 6 Drawing Sheets

METHOD AND APPARATUS FOR SUMMONING A PALETTE

BACKGROUND

Certain applications (e.g., Adobe Illustrator or Adobe Photoshop®, both available from Adobe Systems, Inc., of San Jose, Calif.) may include one or more palettes. A palette generally is used to provide a list of variations of one kind of functionality. For example, a color palette may present a selection of colors from which the user may select. This is different from traditional drop-down or pop-up menus (also referred to herein as in-context user interfaces or in-content UIs) which generally provide selections of different functionality, for example, in a word document an in-content UI can provide different file related functions such as save, open, close or the like.

Palettes generally provide much more functionality than in-content UIs. There may be several different types of palettes. One type of palette is referred to as a docked palette. A docked palette is a palette that is displayed at a certain location on the application interface. Typically a docked palette is places along a side of the application, so as to not interfere with the work area (also referred to as the canvas). The user can arrange the location and order of the docked palettes, such that they are arranged in a user-preferred arrangement which makes the user more efficient. Another type of palette is a floating palette. Similar to a docked palette, a floating palette is a palette that is also displayed. Unlike a docked palette however, a floating palette sits atop the canvas. A palette can also be hidden. A hidden palette is not visible to the user, that is it is not shown on the canvas or on the application interface, and is usually accessible by way of a pull down menu option or similar type of calling tool.

Certain applications may involve the use of a large number of palettes. It is common for a user to dock palettes, wherein a docked palette is fixed along a side of the user display. The user can then mouse over to the docked palette in order to select the desired palette entry. The user can dock the desired palettes in a particular order, arrangement and location while using the application, such that frequently used palettes are readily accessible to the user.

SUMMARY

Conventional mechanisms such as those explained above suffer from a variety of deficiencies. One such deficiency is that when a docked palette is utilized, the user has to move the mouse pointer (also referred to as a cursor) over to the docked palette and select the function the user desires. This can become cumbersome when the user is using an application that requires access to several palettes or repeated access to one or more palettes. Stated differently, in conventional applications (e.g., Adobe Illustrator) a user, in order to utilize a palette, is required to use a mouse pointing device to move the cursor from the current location on the canvas to the palette, instead of having the palette summoned to the cursor location on the canvas.

Embodiments of the invention significantly overcome such deficiencies and provide mechanisms and techniques that summon a palette from a docked state to the cursor location, where the palette can be accessed by the user without the user having to search for or navigate to the docked palette. In a particular embodiment of a method for summoning a palette to a cursor location, the method includes presenting an application, the application having a work area in a Graphical User Interface (GUI), the application including at least one palette associated therewith. The method further includes operating a cursor within the work area. Additionally, the method includes providing an input causing one of the at least one palette to be presented at a location adjacent the cursor, and wherein the palette is maintained at the location.

As an example, a user has some text in a document and desires to change the color of a certain amount of the text. In conventional application, in order to change the color of the portion of text, the text portion would first have to be selected. The user then has to find the text options (either a text palette or an in-context UI) which requires the user to manipulate a mouse or other pointing device to place the cursor over the palette or to have the in-context UI displayed. Then the user can change the color of the selected text. This can result in a lot of tedious and inefficient moving back and forth between the canvas and the palette or in-context UI. By way of the presently disclosed method and apparatus for summoning a palette to a cursor location, the user is able to relocate the palette to the current cursor location as opposed to making the user travel to the palette and back. This greatly reduces the time and efforts required by a user in an application utilizing palettes.

Other embodiments include a computer readable medium having computer readable code thereon for summoning a palette to a cursor location. The computer readable medium includes instructions for presenting an application, the application having a work area in a Graphical User Interface (GUI), the application including at least one palette associated therewith. The computer readable medium further includes instructions for operating a cursor within the work area. The computer readable medium also includes instructions for providing an input causing one of the at least one palette to be presented at a location adjacent the cursor, and wherein the palette is maintained at the location.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides for summoning a palette to a cursor location as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations for summoning a palette to a cursor location as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all devices processes could run on a small set of dedicated computers, or on one computer alone.

It is to be understood that the embodiments of the invention can be embodied strictly as a software program, as software and hardware, or as hardware and/or circuitry alone, such as within a data processing device. The features of the invention, as explained herein, may be employed in data processing and/or software systems for such devices such as those manufactured by Adobe Systems, Inc., of San Jose, Calif.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Referring now to FIG. 1 through FIG. 6, in which like elements are shown having like reference designators, a method and apparatus for summoning palettes to a cursor location is shown.

Figure 1:
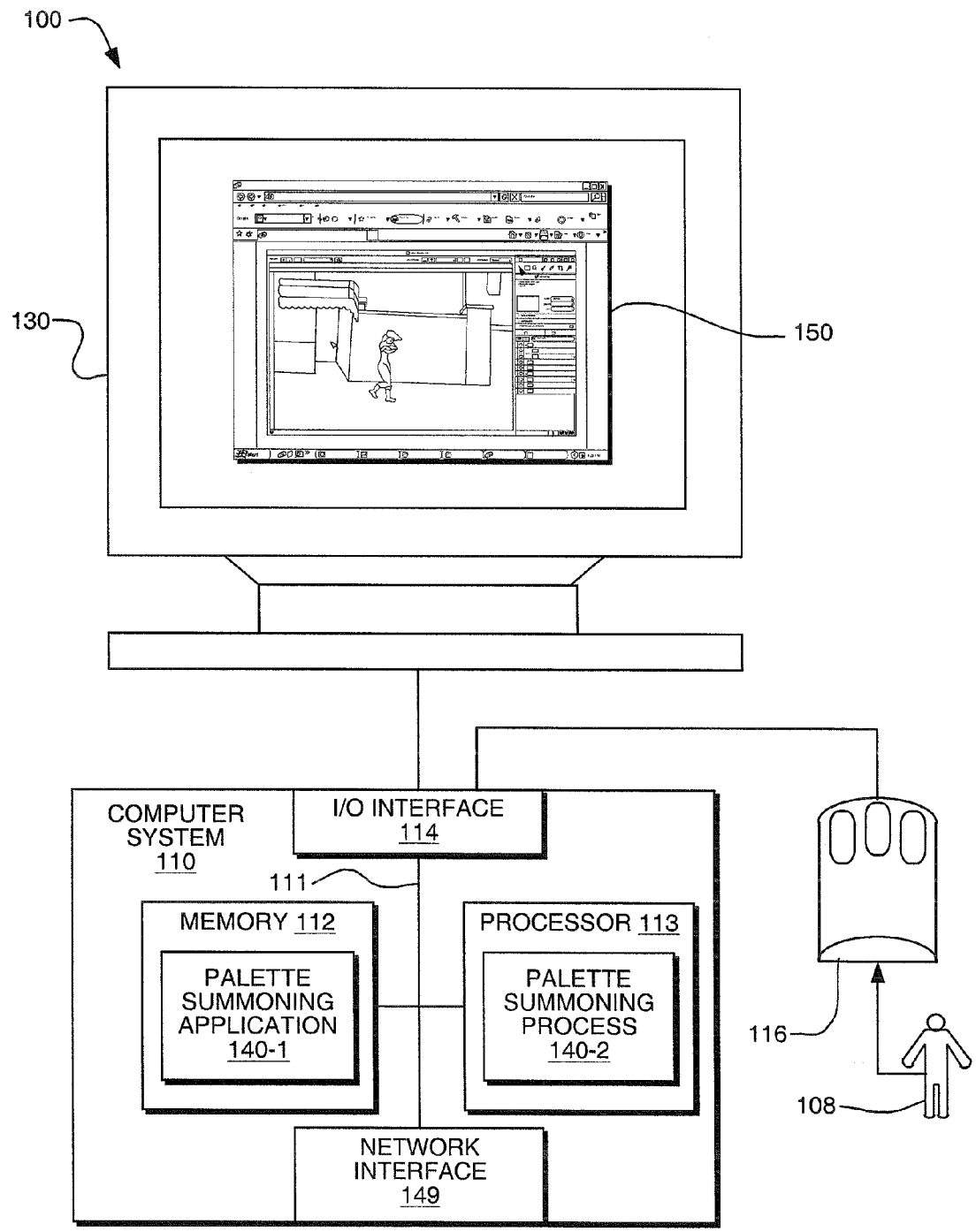
FIG. 1 illustrates an example computer system architecture for a computer system that performs palette summoning in accordance with embodiments of the invention.

FIG. 1 is a block diagram of an environment 100 including an example computer system 110 for implementing a palette summoning function 140 and/or other related processes to carry out the different functionality as described herein. Computer system 110 can be a computerized device such as a computer, workstation, processing device, etc.

As shown, computer system 110 of the present example includes an interconnect 111 that couples a memory system 112 and a processor 113 an input/output interface 114.

As shown, memory system 112 is encoded with palette summoning application 140-1. Palette summoning application 140-1 can be embodied as software code such as data and/or logic instructions (e.g., code stored in the memory or on another computer readable medium such as a disk) that support functionality according to different embodiments described herein.

During operation, processor 113 of computer system 110 accesses memory system 112 via the interconnect 111 in order to launch, run, execute, interpret or otherwise perform the logic instructions of the palette summoning application 140-1. Execution of palette summoning application 140-1 produces processing functionality in palette summoning process 140-2. In other words, the palette summoning process 140-2 represents one or more portions of the palette summoning application 140-1 (or the entire application) performing within or upon the processor 113 in the computer system 110.

It should be noted that, in addition to the palette summoning process 140-2, embodiments herein include the palette summoning application 140-1 itself (i.e., the un-executed or non-performing logic instructions and/or data). The palette summoning application 140-1 can be stored on a computer readable medium such as a floppy disk, hard disk, or optical medium. The palette summoning application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of palette summoning application 140-1 in processor 113 as the palette summoning process 150-2. Those skilled in the art will understand that the computer system 110 can include other processes and/or software and hardware components, such as an operating system that controls allocation and use of hardware resources associated with the computer system 110.

Figure 2:
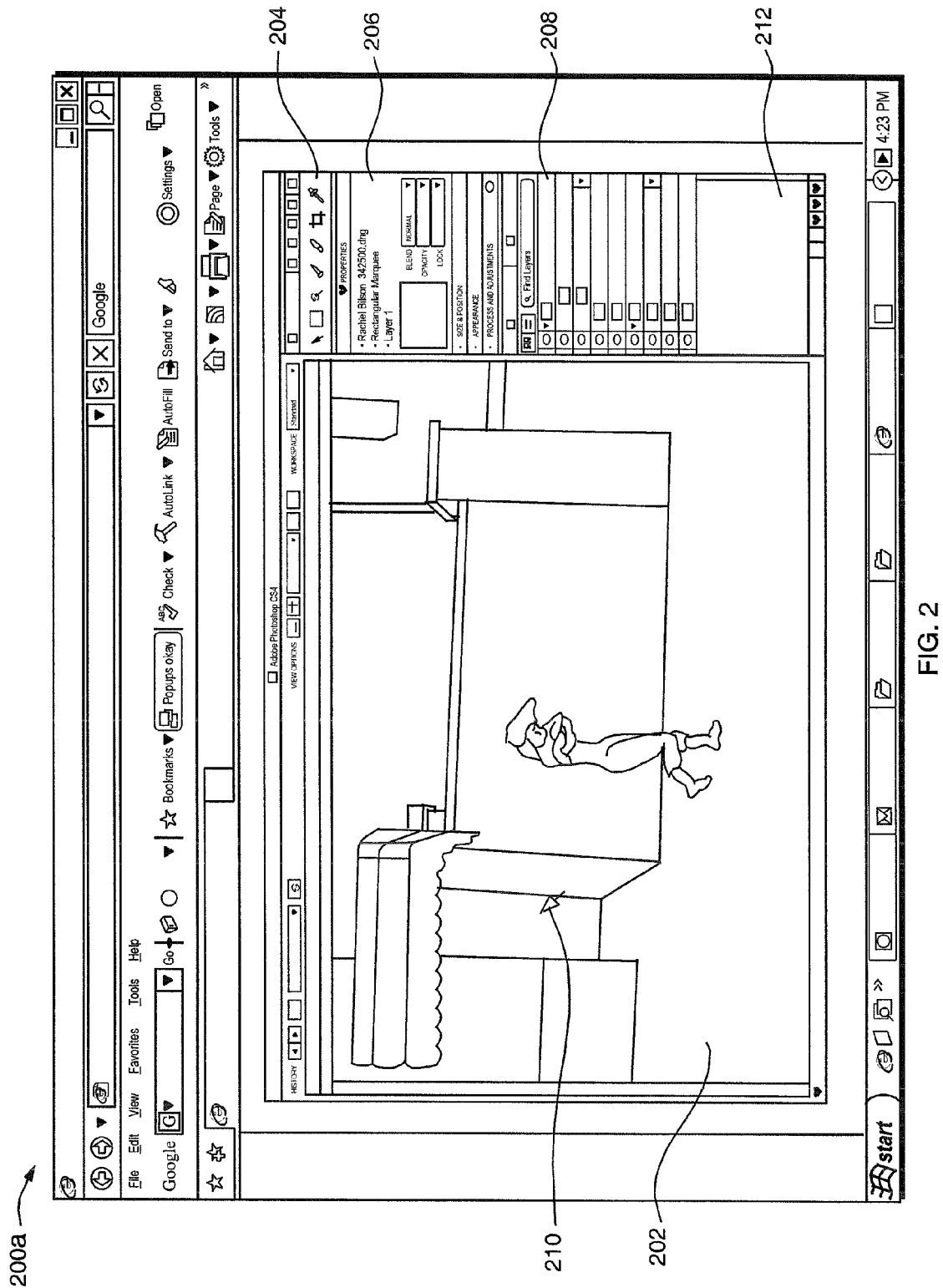
FIG. 2 depicts a Graphical User Interface (GUI) showing docked palettes in accordance with embodiments of the invention.

Referring now to FIG. 2, a particular example of a GUI utilizing the palette summoning process is shown. While a GUI for a particular application is shown, the same or similar concept applies to other applications as well. A GUI 200a is shown. Within GUI 200a is a work area 202. In this example work area 202 is used to display an image of a person running down a street in a foreign land. Adjacent to the work area 202 is a region 212 which has three different docked palettes. In this example docked palette 204 is a Tools Manager palette, docked palette 206 is a Properties palette and docked palette 208 is a layer Palette.

While only three docked palettes are shown, it should be appreciated that any number of palettes could be docked and that the docked palettes can be located anywhere. Typically the application user will define which palettes are docked and the desired location for the docked palettes. Additionally, hidden palettes could also be used. A hidden palette is a palette not displayed on the GUI until it is called by the user. Additionally, floating palettes could also be used. A floating palette is a palette that is located in the work area.

In conventional systems, the user desiring to utilize a particular palette would have to use a mouse device to relocate the cursor 210 (sometimes referred to as a pointer) to the palette in order to utilize the palette. This can become cumbersome when a large number of palettes are being used, when a large display is being used, or a similar type scenario. For example, if the user wanted to use docked palette 204, the user would relocate the cursor 210 from its present position within the work area 202 to the palette 204 and select the desired tool.

Figure 3:
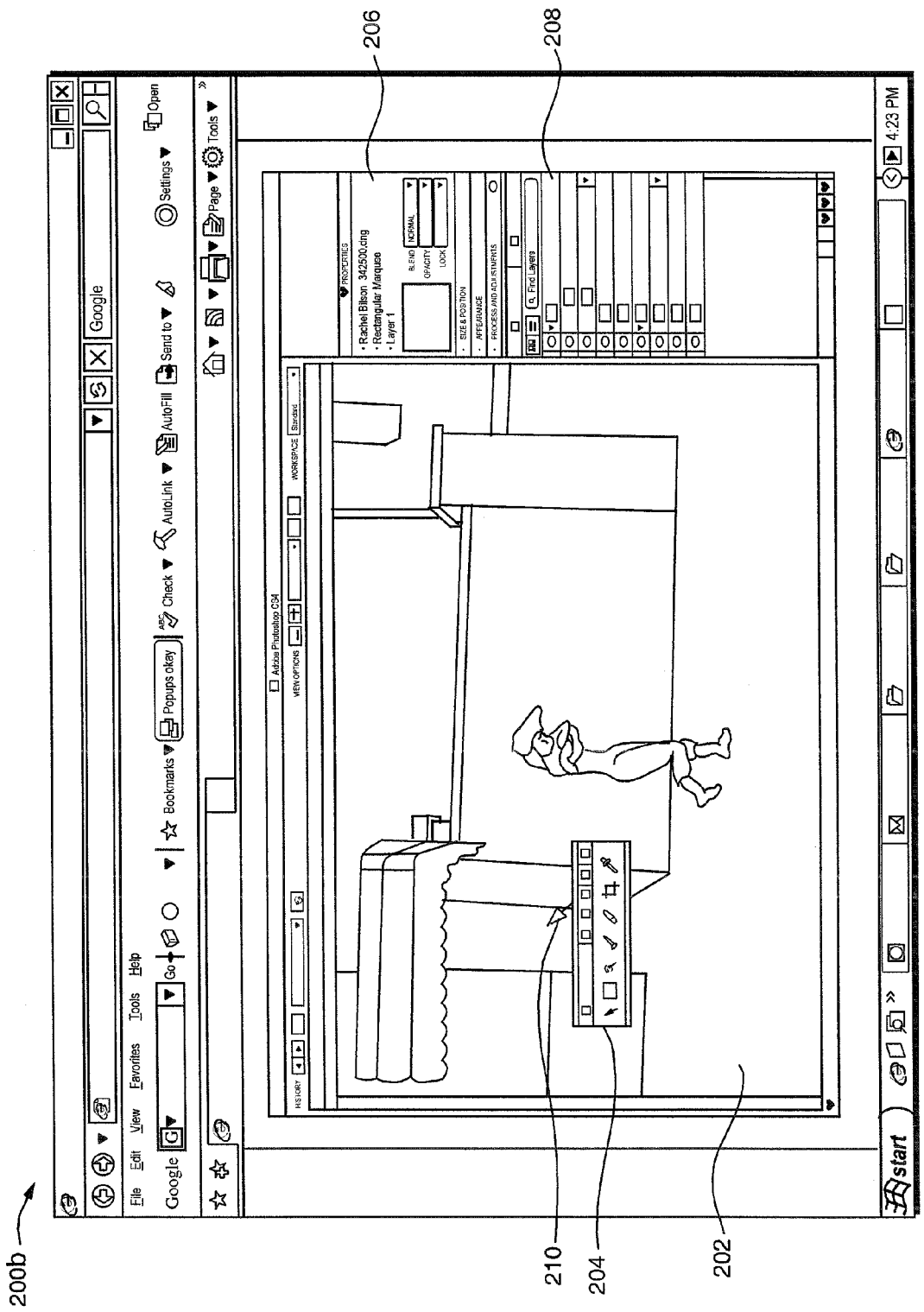
FIG. 3 depicts a Graphical User Interface (GUI) showing a summoned palette in accordance with embodiments of the invention.

Referring now to FIG. 3 GUI 200b is shown. Within GUI 200b is a work area 202. Adjacent to the work area 2002 is a region 212 which has two different docked palettes. In this example docked palette 206 is a Properties palette and docked palette 208 is a layer Palette. By way of the presently disclosed method for summoning palettes, instead of relocating the cursor 210 to the docked palette, the user is able to summon the desired palette to the cursor 210. In this example, the user has entered a particular keystroke or sequence of keystrokes which have been predefined and which result in docket palette 204 being relocated to the cursor. The docked palette 204 is maintained at the cursor location when the keystroke was executed, such that the user can use the cursor to select a desired option within the palette. For example, the user could have entered the left arrow key as a keystroke to cause docked palette 204 to be relocated to the cursor 210 where it is now usable by the user. Alternately, the user could have entered another keystroke (e.g., the down arrow key) and had a different palette (e.g., palette 206, palette 208 or a hidden palette) relocated to the cursor 210.

Figure 4:
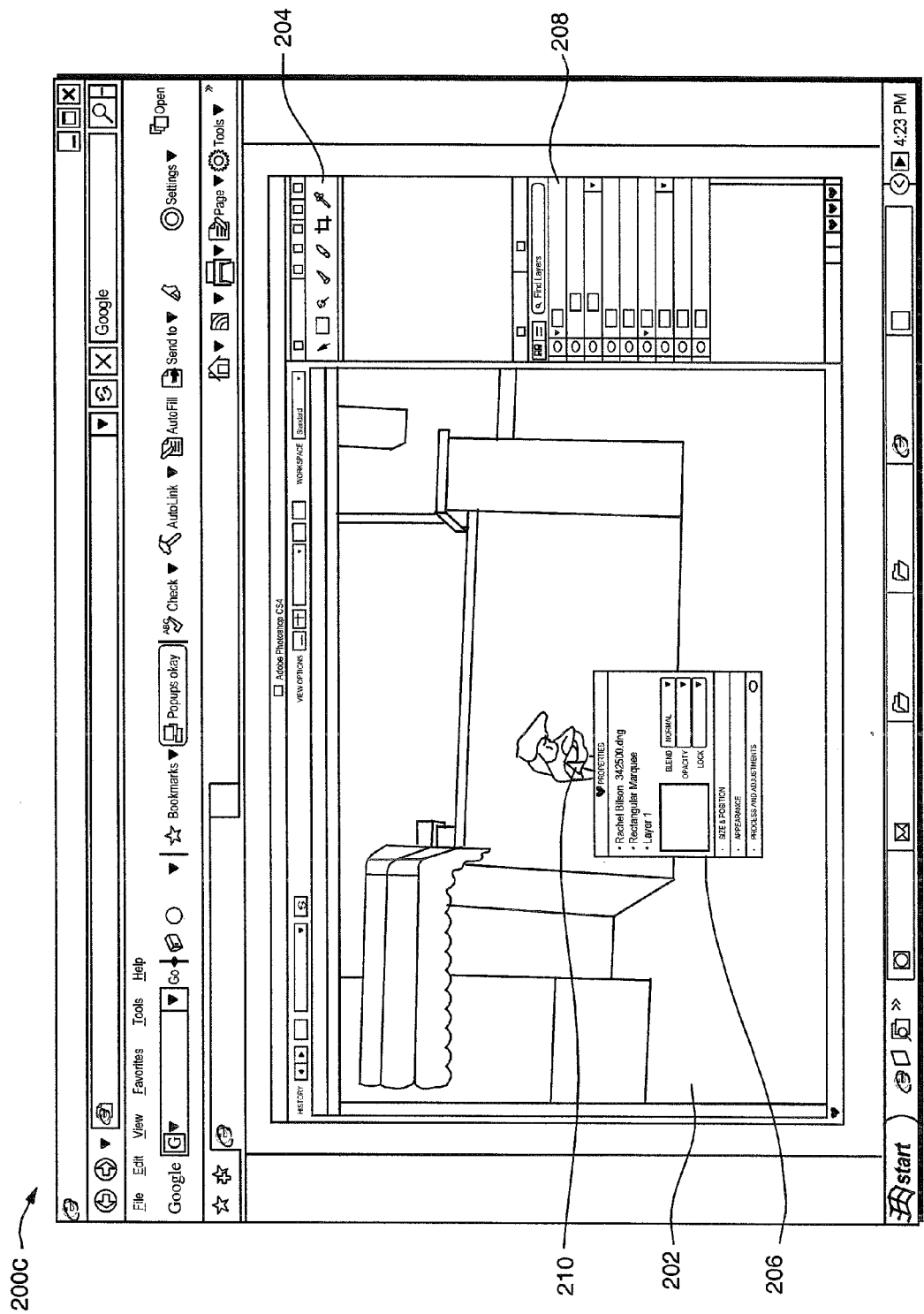
FIG. 4 depicts a Graphical User Interface (GUI) showing another summoned palette in accordance with embodiments of the invention.

Referring now to FIG. 4, GUI 200c is shown. Within GUI 200c is a work area 202. Adjacent to the work area 202 is a region 212 which has two different docked palettes. In this example docked palette 204 is a Tools Manager palette, and docked palette 208 is a layer Palette. By way of the presently disclosed method for summoning palettes, instead of relocating the cursor 210 to the docked palette, the user is able to summon the desired palette to the cursor. In this example, the user has entered a particular keystroke or sequence of keystrokes which have been predefined and which result in docket palette 206 being relocated to the cursor. There are a couple of ways this can be accomplished. Referring back to FIG. 3 in conjunction with FIG. 4, the user can simply enter the keystroke for palette 206, and palette 204 located in work area 202 is replaced with palette 206 located adjacent the cursor 210. Palette 204 is returned to its docked position. Alternately, the user in FIG. 3 could have entered the same keystroke that caused palette 204 to be summoned to cursor 210 and palette 204 is returned to its docked position. The user ten could have entered the keystroke for palette 206 and palette 206 is relocated from its docked position to within work area 202 adjacent cursor 210.

In a particular example, the left arrow key is associated with palette 204 and the right arrow key with palette 206. The user enters the left arrow keystroke and palette 204 is relocated to the cursor. The user utilizes the palette 204, then is done (at least for the time being) with that particular palette 204. The user can then enter the same left arrow keystroke and palette 204 is returned to its original docked position. The user can then enter another keystroke (e.g., the right arrow key stroke) and have palette 206 summoned to the cursor. Alternately, instead of entering the left arrow keystroke to return palette 204 to it's original docked position the user instead could have entered the right arrow keystroke and had palette 204 replaced with palette 206, with palette 204 being returned to its original position.

Figure 5:
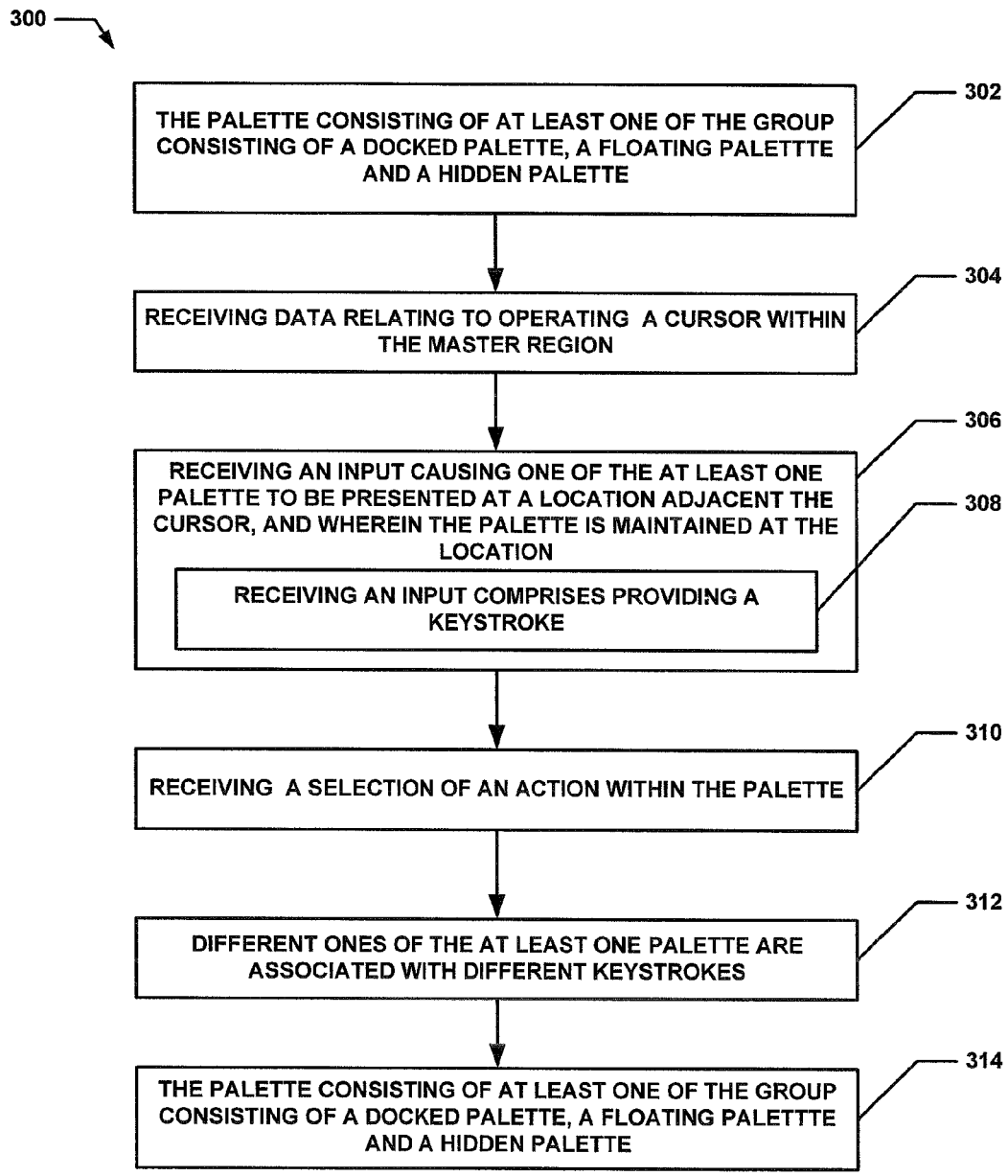
FIG. 5 depicts a flow diagram of a particular embodiment of a method of summoning a palette to a cursor in accordance with embodiments of the invention.
Figure 6:
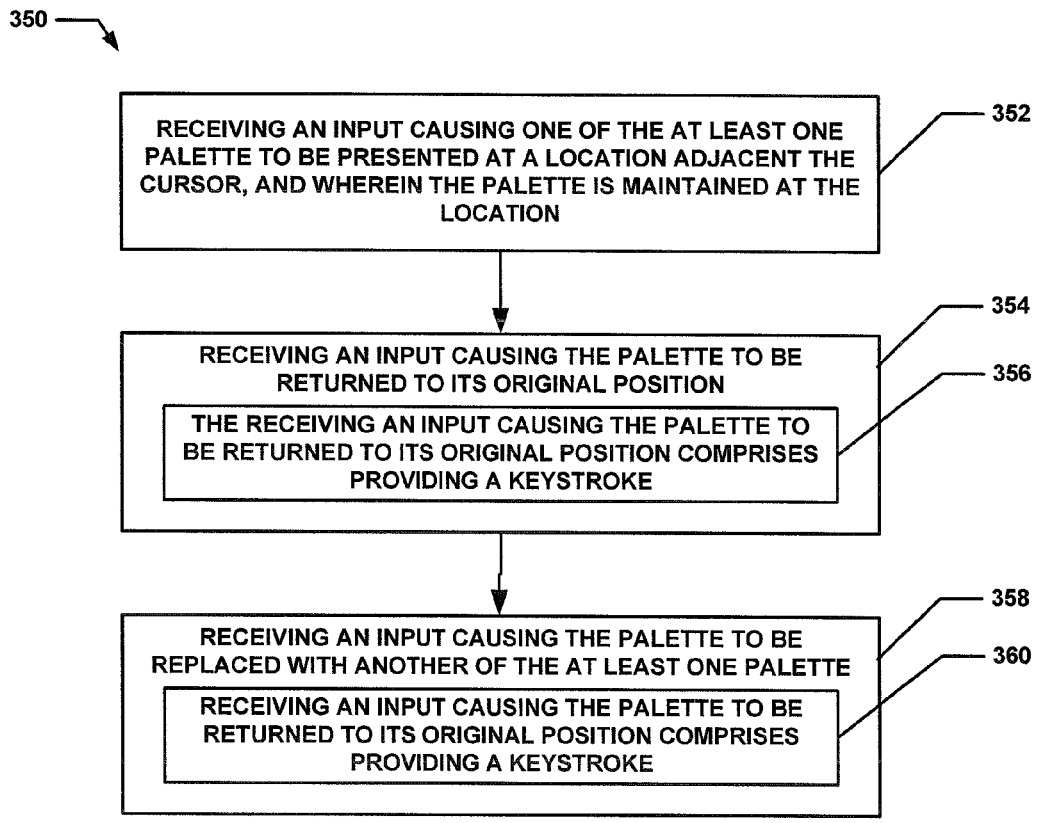
FIG. 6 depicts a flow diagram of a particular embodiment of a method of summoning and repositioning palettes in accordance with embodiments of the invention.

Flow diagrams of particular embodiments of the presently disclosed methods are depicted in FIGS. 5 and 6. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 5, a particular embodiment of a method 300 of summoning palettes to a cursor location is shown. The method 300 begins with processing block 302 which discloses presenting an application, the application having a work area in a Graphical User Interface (GUI), the application including at least one palette associated therewith. The application could be any type of application which utilizes palettes, such as Adobe Illustrator or Adobe Photoshop, both available from Adobe Systems, Inc., of San Jose, Calif.

Processing block 304 states receiving data relating to operation of a cursor within the work area. An operator utilizing a pointing device such as a mouse, trackball or similar type device typically manipulates the cursor around the work area.

Processing block 306 recites receiving an input causing one of the at least one palette to be presented at a location adjacent the cursor, and wherein the palette is maintained at the location. As shown in processing block 308 this can include wherein the receiving an input comprises providing a keystroke. By entering a predefined keystroke associated with a particular palette, the user is able to summon the desired palette to the cursor location, rather than having to move the cursor to the palette. This saves the user from searching for a particular palette and from having to relocate the cursor from its current location on the canvas to the desired palette.

Processing block 310 discloses receiving a selection of an action within the palette. Once the palette has been summoned the palette is stationary at the cursor location within the work area. This allows the user to manipulate the cursor in order to utilize the palette. For example, a user running the Adobe Illustrator application can place a circle on the canvas. The user can than click on the circle and rather than go to a palette (e.g., a palette docked on the right hand side of the application) can have the palette summoned to the cursor location on the canvas. The user can then change certain properties of the circle (e.g., color, border, thickness, size, position) using the palette without having to move the cursor from the work area.

Processing block 312 discloses wherein different ones of the at least one palette are associated with different keystrokes. The user can define keystrokes for often-used palettes, for each and every palette, for docked palettes, for floating palettes, and for hidden palettes.

Processing block 314 states the palette consists of a docked palette, a hidden palette or a floating palette. A docked palette is a palette that is displayed at a certain location on the application interface. Typically a docked palette is placed along a side of the application, so as to not interfere with the work area. The user can arrange the location and order of the docked palettes, such that they are arranged in a user-preferred arrangement which makes the user more efficient. Another type of palette is a floating palette. Similar to a docked palette, a floating palette is a palette that is also displayed. Unlike a docked palette, a floating palette sits atop the canvas. A palette can also be hidden. A hidden palette is not visible to the user, that is it is not shown on the canvas or on the application interface, and is usually accessible by way of a pull down menu option or similar type of summoning tool.

Referring now to FIG. 6, a particular embodiment of a method 350 of summoning and repositioning palettes is shown. The method 350 begins with processing block 352 which recites receiving an input causing one of the at least one palette to be presented at a location adjacent the cursor, and wherein the palette is maintained at the location. As described above, by entering a predefined keystroke associated with a particular palette, the user is able to summon the palette to the cursor location, rather than having to move the cursor to the palette. For example, the user may have associated the left arrow key with a layers palette. When the user desires to use the layers palette, the user merely executes the keystroke (the left arrow key) and the layers palette is relocated to the cursor. The layers palette is maintained at the cursor location when the keystroke was executed, such that the user can use the cursor to select a desired option within the layers palette.

Processing block 354 discloses receiving an input causing the palette to be returned to its original position. As shown in processing block 356, this can include wherein the receiving an input causing the palette to be returned to its original position comprises receiving a keystroke. The user can cause the palette to be returned to its docked, hidden or floating position by executing the same keystroke that caused the palette to be summoned to the cursor. In the example above, executing the left arrow key keystroke results in the layers palette being returned to its prior position (docked floating or hidden).

Processing block 358 states receiving an input causing the palette to be replaced with another one of the at least one palette. As shown in processing block 360, this can include wherein receiving an input causing the palette to be returned to its original position comprises receiving a keystroke. In this case, the user executes a keystroke associated with a different palette. Upon execution, the previously summoned palette is returned to its original position (docked or hidden) and is replaced in the work area with the palette associated with the recently executed keystroke. For example, wherein the layers palette was associated the left arrow key, a properties palette can be associated with the down arrow key. When the left arrow key keystroke is executed the layers palette is summoned to the cursor location on the canvas. Once the user is through with the layers palette, if the user wants to now use the properties palette, the user can simply execute the down arrow key keystroke and the layers palette will be replaced with the properties palette. The layers palette is returned to its original position.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer implemented method comprising:
presenting an application, said application having a work area in a Graphical User Interface (GUI), said application including a plurality of palettes, said palettes displayed at a first position within said GUI;
receiving a position of a cursor within said work area;
receiving a first keystroke or keystroke sequence;
in response to said first keystroke or keystroke sequence, moving one of said palettes from said first position to a second position within said GUI, said second position adjacent to said cursor, and wherein said palette is displayed and maintained at said second position after termination of said input;
receiving a second keystroke or keystroke sequence; and
in response to said second keystroke or keystroke sequence, returning said palette to said first position from said second position, wherein returning said palette comprises displaying said palette at said first position.

2. The method of claim 1 further comprising receiving a selection of an action within said palette.

3. The method of claim 1 wherein said application includes a second one of said palettes at a third position, and in response to said second keystroke or keystroke sequence, moving said second palette from said third position to said second position.

4. The method of claim 1 wherein different ones of said plurality of palettes are associated with different pluralities of keystrokes or keystroke sequences.

5. The method of claim 1, wherein said first keystroke or keystroke sequence or said second keystroke or keystroke sequence is predefined by a user.

6. The method of claim 1, further comprising:
receiving a third keystroke or keystroke sequence; and
determining said first position based on said third keystroke or keystroke sequence.

7. The method of claim 1, wherein said palette comprises a Tools Manager palette, a color palette, a properties palette, or a layers palette.

8. The method of claim 3 wherein said palette and said second palette provide respective variations of one kind of functionality.

9. A computer readable storage medium having computer readable code stored thereon, the medium comprising:
instructions for presenting an application, said application having a work area in a Graphical User Interface (GUI), said application including a plurality of palettes, said palettes displayed at a first position within said GUI;
instructions for receiving a position of a cursor within said work area;
instructions for receiving a first keystroke or keystroke sequence;
instructions for, in response to said first keystroke or keystroke sequence, moving one of said palettes from said first position to a second position within said GUI, said second position adjacent to said cursor, and wherein said palette is displayed and maintained at said second position after termination of said input;
instructions for receiving a second keystroke or keystroke sequence; and
instructions for, in response to said second keystroke or keystroke sequence, returning said palette to said first position from said second position, wherein returning said palette comprises displaying said palette at said first position.

10. The computer readable medium of claim 9 further comprising instructions for receiving an action within said palette.

11. The computer readable medium of claim 9 wherein said application includes a second one of said palettes at a third position and further comprising instructions for, in response to said second keystroke or keystroke sequence, moving said second palette from said third position to said second position.

12. The computer readable medium of claim 9 further comprising instructions wherein different ones of said plurality of palettes are associated with different pluralities of keystrokes or keystroke sequences.

13. The computer readable medium of claim 9 wherein said palette includes at least one of the group consisting of a docked palette, a floating palette and a hidden palette.

14. The computer readable medium of claim 9, further comprising instructions for:
 receiving a third keystroke or keystroke sequence; and
 determining said first position based on said third keystroke or keystroke sequence.

15. A computer system comprising:
 a memory;
 a processor;
 a communications interface;
 an interconnection mechanism coupling the memory, the processor and the communications interface; and
 wherein the memory is encoded with an application summoning a palette to a cursor position, that when performed on the processor, provides a process for processing information, the process causing the computer system to perform the operations of:
  presenting an application, said application having a work area in a Graphical User Interface (GUI), said application including a plurality of palettes, said palettes displayed at a first position within said GUI;
  receiving a position of a cursor within said work area; and
  receiving a first keystroke or keystroke sequence;
  in response to said first keystroke or keystroke sequence, moving one of said palettes from said first position to a second position within said GUI, said second position adjacent to said cursor, and wherein said palette is displayed and maintained at said second position after termination of said input;
  receiving a second keystroke or keystroke sequence; and
  in response to said second keystroke or keystroke sequence, returning said palette to said first position from said second position, wherein returning said palette comprises displaying said palette at said first position.

16. The computer system of claim 15 wherein the process further causes the computer system to perform the operations of receiving of a selection of an action within said palette.

17. The computer system of claim 15 wherein said application includes a second one of the palettes at a third position and wherein the process further causes the computer system to perform the operations of, in response to said second keystroke or keystroke sequence, moving said second palette from said third position to said second position.

* * * * *